May 25, 1965     O. STERNBECK     3,185,905
ELECTRIC CONDENSER EMBEDDED IN A THERMOSETTING RESIN
AND PROVIDED WITH A PROTECTOR BREAKABLE
BY AN INTERIOR OVERPRESSURE
Filed Dec. 21, 1962
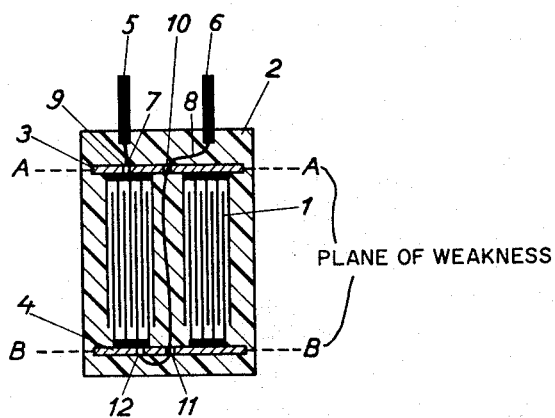
INVENTOR
OLAF STERNBECK
BY Hane and Nydick
ATTORNEYS 3,185,905
ELECTRIC CONDENSER EMBEDDED IN A THERMOSETTING RESIN AND PROVIDED WITH A PROTECTOR BREAKABLE BY AN INTERIOR OVERPRESSURE
Olaf Sternbeck, Vallingby, Sweden, assignor to Telefonaktiebolaget L M Ericsson, Stockholm, Sweden, a corporation of Sweden
Filed Dec. 21, 1962, Ser. No. 246,416
Claims priority, application Sweden, Feb. 2, 1962, 1,145/62
2 Claims. (Cl. 317—256)

The present invention refers to an electric condenser embedded in a thermosetting resin in which condenser a connection wire serves as a protector by being arranged to be torn off, if the condenser should burst because of interior pressure.

Condensers wound of a metallized dielectric foil, for instance paper, have certain self-healing properties. As a result, when faults occur, they may not cause a short-circuit that would blow an exteriorly connected fuse, as is the case, for example, in condensers wound of a metal foil. During certain circumstances, specially with alternating operation, an excessive overheating of the condenser may occur. At a certain temperature these condensers are instable as regards temperature. An increase in temperature will result in increased losses and consequently increased heating, whereby the interaction between increase of temperature and increase of losses finally causes ignition, provided the current is not interrupted in time.

Organic material in the condenser when overheated becomes charred, and a formation of gas occurs, which causes an abnormally high pressure in the condenser. In condensers enclosed in a metal envelope the risk of fire is avoided by means of a protector device, that is actuated by the pressure. The closing cover, for instance, may be made weaker than the rest of the envelope, so as to be cambered by the increased interior pressure. A connection wire stretched between the winding and the cover is thereby torn off, so that the current supply is disconnected and ignition avoided.

In condensers embedded in a thermosetting resin such a protector device has been impossible to use due to the rigidity of the resin body. The resin body generally bursts in an irregular manner when the condenser is overheated.

The invention has for an object to solve this problem, and this is achieved by the provision of a disc embedded in the resin, at least at one end of the condenser winding. This disc is loosely adhering to the resin so that the strength of adherence is less than the structural strength of the resin, and at least one of the connection wires of the condenser winding is passed through the disc, whereby the resin body in case of overheating and gas formation caused thereby initially bursts along the disc, so that said connection wire is torn off.

The invention will be further described by means of an embodiment with reference to the attached drawing that shows a view of the condenser in cross section.

A condenser winding 1 is embedded in a body 2 of epoxy resin. At the ends of the winding two discs 3 and 4 are provided, which discs adhere loosely to the epoxy and are entirely encapsulated in the resin, but extend closely to the side wall of the resin body. In the resin body are fixed two contact terminals 5 and 6 for exterior connections. The two terminals are joined to two wires 7 and 8 leading to the electrodes of the condenser. Said wires are entirely embedded in the epoxy, and the wire 7 is passed through a hole 9 of the disc 3, while the other wire 8 runs through a hole 10 in the disc 3 as well as through two holes 11 and 12 of the disc 4.

In case of an overheating of the condenser winding which causes formation of gas, said gases will penetrate to the ends of the winding and when the pressure has increased sufficiently, the resin body will burst substantially along one of the sections indicated by the dotted lines A—A and B—B respectively. It is not necessary, of course, to provide the condenser with a disc at both ends of the winding. However, if the condenser is provided with a disc at one end only, it is convenient to reinforce the resin body at the other end by increasing the thickness of the exterior resin layer.

The resin body need not necessarily be made of epoxy. Other thermosetting resins may be used, provided they are not appreciably thermoplastic, for instance, polyester and similar resins. A suitable convenient material for the discs 3 and 4 are polypropylene and waxed cardboard.

I claim:
1. A potted capacitor comprising a capacitor coil made of metallized dielectric foil, a substantially rigid disc disposed adjacent to one end face of the coil substantially parallel thereto, a body of hardened thermosetting resin encapsulating said coil and said disc, said disc being loosely adhered to said resin body and having a diameter extending close to the outside of said body, said resin body having a plane of structural weakness in the plane of said disc, and wire conductors extending from the outside through said body and connected at the inner end to the terminals of said coil, one of said wire conductors extending through said plane of weakness and being held substantially taut in said body whereby said wire conductor is torn when the body is ruptured at said plane.

2. A potted capacitor according to claim 1 wherein said resin body is substantially cylindrical, said coil being lengthwise encapsulated in the body, said one wire conductor extending through the disc from the next adjacent face end of the body and being held substantially straight within the body.

References Cited by the Examiner
UNITED STATES PATENTS 2,703,390  3/55  Marks _____ 336—96
3,046,452  7/62  Gellert _____ 174—52

JOHN F. BURNS, *Primary Examiner.*
JOHN P. WILDMAN, *Examiner.*